(12) United States Patent  
Qu et al.

(10) Patent No.: US 8,982,932 B2  
(45) Date of Patent: Mar. 17, 2015

(54) ACTIVE AUXILIARY CHANNEL BUFFERING

(75) Inventors: Ming Qu, San Jose, CA (US); Zhengyu Yuan, Cupertino, CA (US); Kochung Lee, San Jose, CA (US)

(73) Assignee: Parade Technologies, Ltd., George Town (KY)

( * ) Notice: Subject to any disclaimer, the term of this patent is extended or adjusted under 35 U.S.C. 154(b) by 941 days.

(21) Appl. No.: 12/645,240

(22) Filed: Dec. 22, 2009

(65) Prior Publication Data

US 2011/0150055 A1   Jun. 23, 2011

(51) Int. Cl.
| | |
|---|---|
| *H04B 1/38* | (2006.01) |
| *H04L 5/16* | (2006.01) |
| *G09G 5/00* | (2006.01) |
| *H04L 29/06* | (2006.01) |
| *H04L 29/08* | (2006.01) |

(52) U.S. Cl.
CPC .......... *G09G 5/006* (2013.01); *G09G 2330/021* (2013.01); *G09G 2350/00* (2013.01); *G09G 2370/045* (2013.01); *G09G 2370/10* (2013.01); *H04L 65/4092* (2013.01); *H04L 65/4023* (2013.01); *H04L 67/34* (2013.01)
USPC ............................. 375/220; 375/240; 370/254

(58) Field of Classification Search
USPC .................... 375/220, 240; 370/254, 315, 329
See application file for complete search history.

(56) References Cited

U.S. PATENT DOCUMENTS

| | | | | |
|---|---|---|---|---|
| 2006/0143661 | A1* | 6/2006 | Funderburk et al. | 725/76 |
| 2007/0257923 | A1* | 11/2007 | Whitby-Strevens | 345/520 |
| 2008/0205519 | A1* | 8/2008 | Goodart et al. | 375/240.12 |
| 2009/0262667 | A1* | 10/2009 | Kobayashi | 370/254 |
| 2009/0279473 | A1* | 11/2009 | Lu et al. | 370/315 |
| 2010/0043045 | A1* | 2/2010 | Shakiba et al. | 725/119 |
| 2010/0050007 | A1* | 2/2010 | Jiang | 713/324 |
| 2010/0150278 | A1* | 6/2010 | Lee et al. | 375/340 |
| 2013/0079846 | A1* | 3/2013 | Single | 607/57 |
| 2013/0130730 | A1* | 5/2013 | Marcellino et al. | 455/466 |

\* cited by examiner

*Primary Examiner* — Freshteh N Aghdam  
(74) *Attorney, Agent, or Firm* — Fenwick & West LLP

(57) ABSTRACT

A system and a method for communicating configuration data between a source device and a sink are described. An active buffer receives data from an auxiliary communication channel which communicates data between the source device and the sink device. The active buffer modifies data received from the auxiliary communication channel. For example, the active buffer amplifies the received data or electrically reshapes the received data. The modified data is then transmitted from the active buffer to a destination device. In one embodiment, the auxiliary communication channel is bi-directional and upon receiving data from a first device, the active buffer is modified to permit uni-directional transmission of data from the first device to a second device.

13 Claims, 4 Drawing Sheets

ACTIVE AUXILIARY CHANNEL BUFFERING

BACKGROUND

1. Field of Art

The present invention generally relates to the field of integrated semiconductor circuits, and more specifically, to high-speed integrated semiconductor circuits for interfacing with digital video or audio.

2. Description of the Related Art

DisplayPort is an industrial standard of digital interface between two or more devices. Commonly, a DisplayPort interface controls transfer of video and/or audio from a source device, such as a computer, a digital video disk (DVD) player or a digital video recorder (DVR), to a sink device, such as a television, a home theater system or a computer monitor. DisplayPort uses two channels, a Main Link and an Auxiliary Channel (AUX-CH) for communication between source device and sink device. The Main Link serially transmits video, audio and other secondary data at rates of 1.62 Gigabits per second (Gbps) or 2.7 Gbps while the AUX-CH carries management and device control data for establishment or configuration of the Main Link at a rate of 1 Megabit per second (Mbps). Transmission of data through the AUX-CH is initiated by the source device allowing the source device to modify Main Link characteristics, although the sink device may prompt modification of the Main Link by sending an interrupt request (IRQ) to the source device via the AUX-CH.

A common function for the AUX-CH is handshaking to train the Main Link between source device and sink device. Depending on the distance between the source device and the sink device, the source device and sink device use different parameter sets to optimize data transmission through the Main Link. Link training allows the source device and sink device to negotiate with each other to determine the optimal Main Link parameter settings for different transmission scenarios. For example, link training allows the source device and sink device to determine values for lane counter, link rate, transmission main link voltage swing, main link pre-emphasis to optimize transmission. For example, when the source device and sink device connected by a short length of DisplayPort cable, a high bit rate is used with minimum voltage swing and no pre-emphasis. Alternatively, when the source device and sink device are connected by a long length of DisplayPort cable, a low bit rate is used with higher voltage swing and pre-emphasis values. However, when the source device and sink device are connected by a long length of DisplayPort cable, data transmitted along the AUX-CH is attenuated, weakening the data received by the sink device.

SUMMARY

In an embodiment, an active buffer comprises a signal detector coupled to an auxiliary channel. The signal detector determines whether data is being received from the auxiliary channel. In an embodiment, the signal detector determines that data is received from the auxiliary channel when received data equals or exceeds a threshold value. Responsive to receiving data from the auxiliary channel, signal modification module coupled to the signal detection module modifies an attribute of the stored data to generate modified data which is transmitted from the active buffer to a destination device. For example, the signal modification module increases an amplitude associated with the received data or reshapes the received data to improve signal integrity for subsequent transmission. For example, the signal modification module reshapes the received data to increase the distance that the modified data is able to be transmitted.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
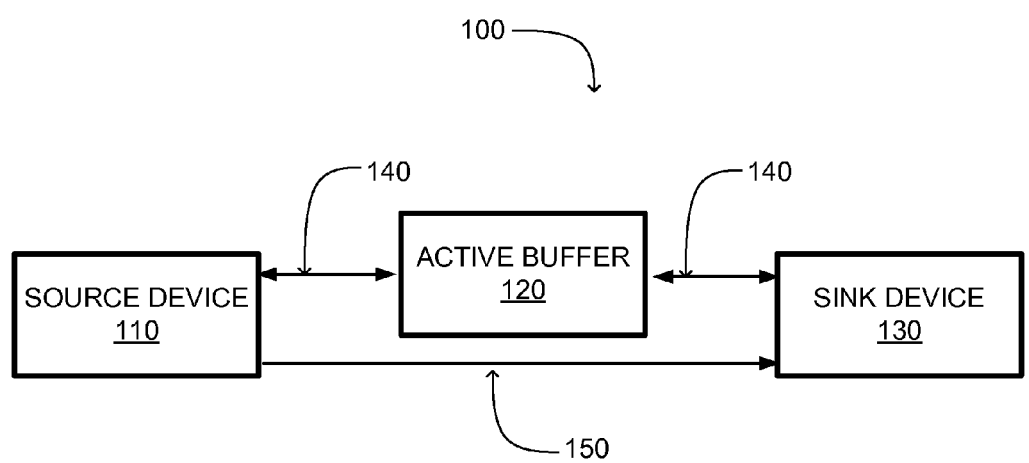
FIG. 1 is a block diagram of a system for transmitting video data and configuration data according to one embodiment of the invention.

A system and method for storing or modifying data transmitted via a communication channel between a source device and a sink device are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form to avoid obscuring the invention.

Reference will now be made in detail to several embodiments, examples of which are illustrated in the accompanying Figures. It is noted that wherever practicable similar or like reference numbers may be used in the figures and may indicate similar or like functionality. The Figures depict embodiments of the present invention for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 illustrates one embodiment of a system 100 for communicating audio and/or video data as well as configuration data between a source device 110 and a sink device 130. The system 100 includes two data transmission channels, an Auxiliary Channel (AUX-CH) 140 and a Main Link 150. An active buffer 120 is coupled to the source device 110 and to the sink device 130 via the AUX-CH 140.

The source device 110 is any device which transmits video and/or audio data, such as a digital video recorder (DVR), a digital video disk player (DVD) player, a computer, a hard drive or another storage device including video and/or audio data. In the conventional system 100, the source device 110 is the master device and the sink device 130 is the slave device. Hence, the source device 110 initiates communication with a sink device 130 and also modifies characteristics of the Main Link 150 communication channel between source device 110 and sink device 130. However, the sink device 130 communicates an interrupt request to the source device 110 to initiate or prompt configuration or modification of the Main Link 150, allowing the sink device 130 to aid in maintaining the Main Link 150.

The sink device 130 is any device which receives video and/or audio data, such as a television (TV), computer monitor, home theater system or other device which receives and processes video and/or audio data. Although the sink device 130 is the slave device, the sink device 130 may also initiate Main Link 150 configuration. In an embodiment the sink device 130 prompts initiation Main Link 150 configuration by sending an interrupt request (IRQ) to the source device 110.

The AUX-CH 140 is a bi-directional communication link which transmits data for establishing or configuring the Main Link 150 between the source device 110 and the sink device 130 or transmits data for controlling the source device 110 or sink device 130. For example, the AUX-CH 140 comprises an Alternating Current (AC) coupled, doubly terminated differential pair. In an embodiment, the AUX-CH 140 transmits data at a rate of 1 Megabit per second (Mbps). Additionally, the AUX-CH 140 is used for the initial "handshake" establishing the Main Link 150 between source device 110 and sink device 130. Further, the source device 110 uses the AUX-CH 140 to check the validity and status of the Main Link 150 and also uses the AUX-CH to implement any modifications to the Main Link 150. Hence, the AUX-CH 140 is used to establish and maintain the Main Link 150 connection between source device 110 and sink device 130. The AUX-CH also transmits data from the sink device 130 to the source device 110, allowing the sink device to 130 request or initiate modification of the Main Link 150.

While AUX-CH 140 communicates configuration and/or control data, the Main Link 150 transmits video and/or audio data from the source device 110 to the sink device 130. The Main Link 150 is a uni-directional communication channel which transmits video and/or audio data from source device 110 to sink device 130. For example, the Main Link 150 comprises one or more AC-coupled, doubly-terminated differential pairs, commonly referred to as "lanes." In an embodiment, the Main Link 150 supports two data rates, 2.7 Gigabits per second (Gbps) and 1.62 Gbps. Hence, the Main Link 150 allows for high-speed transmission of video and/or audio data from source device 110 to sink device 130 without link or device configuration or maintenance data.

An active buffer 120 is coupled to the AUX-CH 140 and receives data transmitted from the source device 110 to the sink device 130 via the AUX-CH 140, as well as data transmitted from the sink device 130 to the source device 110 via the AUX-CH 140. The active buffer 120 modifies data received from the AUX-CH 140 subsequently transmits the modified data to a destination device. For example, the active buffer 120 receives a configuration command, a control command, a Monitor Control Command Set (MCCS) command, an Extended Display Identification Data (EDID) access or other command from the source device 110, increases the amplitude of the configuration command or other command, as described above, and transmits the amplified configuration command to the sink device 130. In an embodiment, the active buffer 120 stores data received from the AUX-CH 140 and associates a type or format with the received data, then modifies the received data based on the associated type or format. For example, the active buffer 120 determines whether received data is a configuration command or a link training command. According to one embodiment, the active buffer 120 modifies received data associated with a specific type or format to expedite or improve data communication between the source device 110 and the sink device 130. Hence, the active buffer 120 modifies one or more attributes of received data to improve data transmission between devices, consequently improving configuration of the Main Link 150 as well as the source device 110 or sink device 130. The active buffer 120 is further described below in conjunction with FIG. 3.

Figure 2:
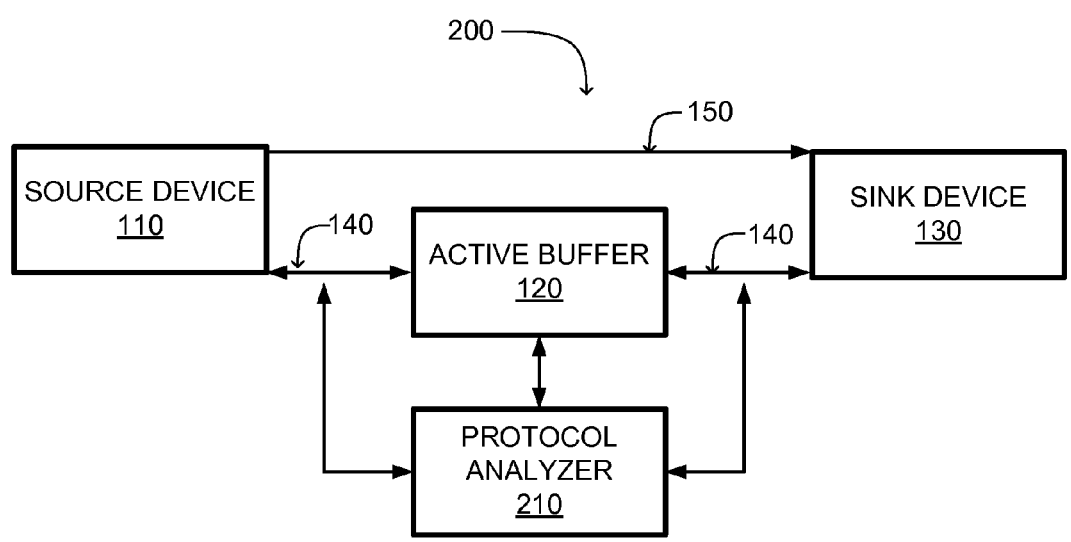
FIG. 2 is a block diagram of a system for analyzing transmitted configuration data according to one embodiment of the invention.

FIG. 2 shows a block diagram of an alternative embodiment of a system 200 for analyzing configuration, control, command or other data transmitted via the AUX-CH 140. The system 200 includes a source device 110 and a sink device 130. Additionally, an AUX-CH 140 and a Main Link 150 are used to transmit configuration or control data and video and/or audio data, respectively. The source device 110, sink device 130, AUX-CH 140 and Main Link 150 are further described above in conjunction with FIG. 1. An active buffer 120, as described above in conjunction with FIG. 1, is coupled to the AUX-CH 140 and receives data from the source device and/or the sink device 130. Additionally, the active buffer 120 is further described below in conjunction with FIG. 3.

In the system 200, a protocol analyzer 210 receives data from the source device 110 and from the sink device 120 through the AUX-CH 140. In an embodiment, the protocol analyzer 210 is also coupled to the active buffer 120 to access data from the active buffer 120. The protocol analyzer 210 determines a protocol or type associated with the received data. For example, the protocol analyzer 210 determines whether received data is associated with link training data or with other configuration data or control data, such as a control command, a Monitor Control Command Set (MCCS) command, an Extended Display Identification Data (EDID) access or other suitable data. In one embodiment, the protocol analyzer 210 also modifies a subset of the received data, such as commands or data associated with a protocol or a type, and transmits the modified data to a destination device. For example, the protocol analyzer 210 modifies a parameter of a received command associated with link training to improve data transmission using the Main Link 150 by modifying the configuration or control information communicated by the source device 110. In an embodiment, the protocol analyzer 210 transmits the modified configuration or control information to the active buffer 120, which further modifies the configuration or control data and transmits the additionally modified configuration or control data. For example, the active buffer 120 electrically reshapes the modified configuration or control data to allow the modified configuration or control data to be transmitted a greater distance without loss of integrity.

In an embodiment, the protocol analyzer 210 modifies the temporal order in which data is transmitted to a destination by the active buffer 120. In an embodiment, the temporal order of transmission is modified based on a type or protocol associated with data or another attribute associated with received data. For example, the protocol analyzer 210 identifies configuration, or control, commands communicates with the active buffer 120 to transmits the configuration, or control, commands prior to transmitting other types of data. Modifying the order in which commands, or other data, are sent to a destination device by the active buffer 120 allows the protocol analyzer 210 to streamline device configuration by sending commands, or other data, in an order which optimizes performance of the Main Link 150. While FIG. 2 shows a system 200 where the active buffer 120 and the protocol analyzer 210 are discrete components coupled in parallel to the AUX-CH 140, in other embodiments, the protocol analyzer 210 is included in the active buffer 120 or the protocol analyzer 210 and the active buffer 120 are included in a single component, allowing a single component to store, modify and analyze data received from the AUX-CH 140.

Figure 3:
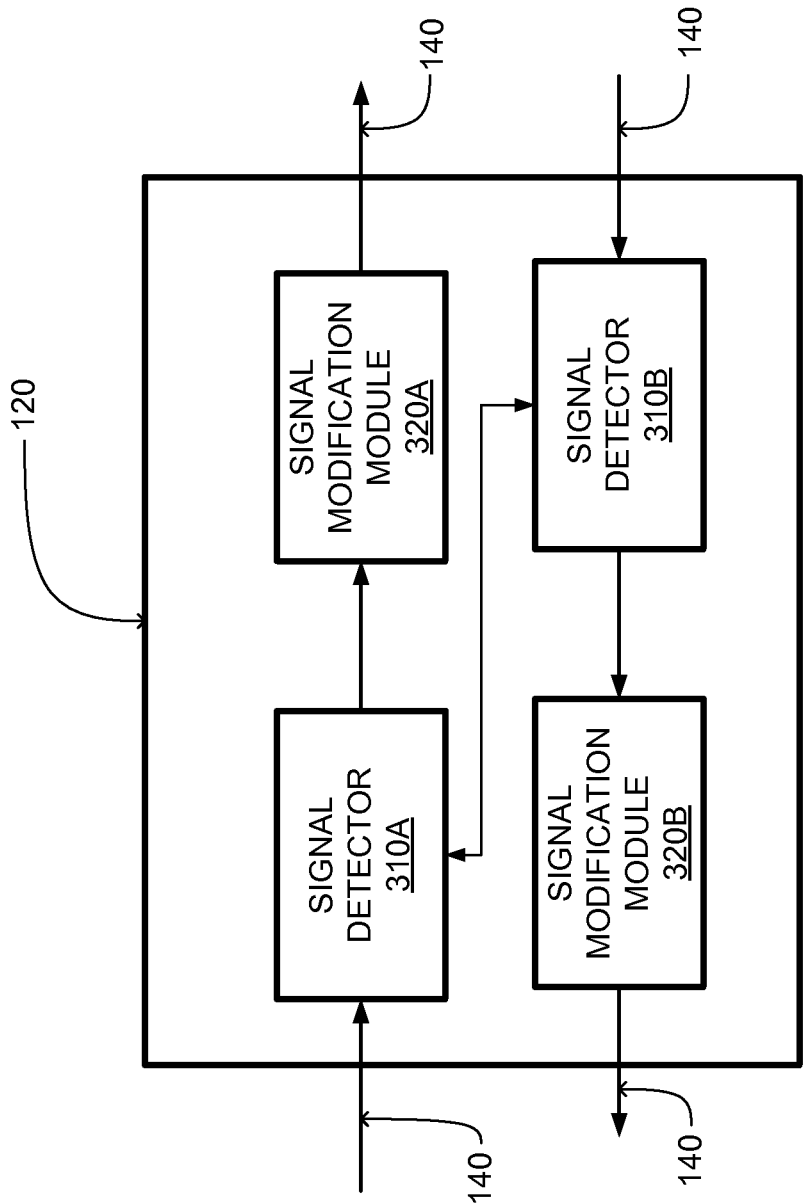
FIG. 3 is a block diagram of an active buffer for modifying configuration data transmitted between a source device and a sink device according to one embodiment of the invention.

FIG. 3 is a block diagram of an active buffer 120 for modifying configuration data, or other data, transmitted between a source device 110 and a sink device 130 according to one embodiment of the invention. As shown in FIG. 3, the active buffer 120 comprises signal detectors 310A, 310B and signal modification modules 320A, 320B. However, in other embodiments, the active buffer 120 includes different and/or additional components than the ones shown in FIG. 3.

The signal detectors 310A, 310B receive data from the AUX-CH 140 and determines whether the AUX-CH 140 includes a signal. For example, the signal detectors 310A, 310B determine whether a configuration command, a control command or other data is being transmitted via the AUX-CH 140. In one embodiment, the signal detectors 310A, 310B compare an attribute of data received from the AUX-CH 140 to a threshold value which determines that the AUX-CH 140 is transmitting data, or otherwise includes a signal, if the data from the AUX-CH 140 equals or exceeds a threshold value. For example, if data from the AUX-CH 140 has a voltage equaling or exceeding a threshold voltage, the signal detectors 310A, 310B determines that the AUX-CH 140 is transmitting data.

Because the AUX-CH 140 is bi-directional, both the source device 110 and the sink device 130 may provide data to the AUX-CH 140 for transmission. Because of this bi-directionality, a first signal detector 310A receives data transmitted from the source device 110 to the sink device 130 through the AUX-CH 140 and a second signal detector 310B receives data transmitted from the sink device 130 to the source device 110 via the AUX-CH 140. By including the first signal detector 310A and the second signal detector 310B, the active buffer 120 is able to receive and modify data transmitted in both directions permitted by the AUX-CH 140.

Additionally, the signal detectors 310A, 310B modify the direction in which the active buffer 120 transmits data. For example, responsive to the first signal detector 310A detecting data transmitted from the source device 110 to the sink device 130, the first signal detector 310A communicates a disable signal to the second signal detector 320B. The disable signal prevents the second signal detector 320B from transmitting data received from the sink device 130 to the source device 110 using the active buffer 120. Similarly, responsive to the second signal detector 310B detecting data transmitted from the sink device 130 to the source device 110, the second signal detector 310B communicates a disable signal to the first signal detector 310A, preventing the active buffer 120 from transmitting data from the source device 110 to the sink device 130. Hence, the signal detectors 310A, 310B modify operation of the active buffer 120 so that data is uni-directionally transmitted by the active buffer depending on the device from which the data was received.

In an embodiment, the signal detectors 310A, 310B also determine whether a signal modification module 320A, 320B is operational or is in a power-off state, allowing conservation of power. For example, the signal modification modules 320A, 320B remain in a power-off state until a signal detector 310A, 310B detects data transmitted from the source device 110 or transmitted from the sink device 130, as described above. When a signal detector 310A, 310B detects data transmission using the AUX-CH 140, the signal detector 310A, 310B generates an enable signal which causes a power supply to provide power to a signal modification module 320A, 320B. Hence, the signal detectors 310A, 310B allow power conservation by allowing the signal modification modules 320A, 320B to remain powered off until the AUX-CH 140 includes data traffic.

A first signal modification module 320A is coupled to the first signal detector 310A and to the AUX-CH 140. Similarly, a second signal modification module 320B is coupled to the second signal detector 310B and to the AUX-CH 140. Data from the source device 110 is detected by the first signal detector 310A and communicated to the first signal modification module 320A, which modifies the data and communicates the modified data to the sink device 130 via the AUX-CH 140. Similarly, data from the sink device 130 is detected by the second signal detector 310B and communicated to the second signal modification module 320B, which modifies the data and communicates the modified data to the source device 110 via the AUX-CH 140. In one embodiment, the signal modification modules 320A, 320B comprises amplifiers which increase an amplitude of data from a signal detection module 310A, 310B, such as increasing a voltage or a current, and transmits the amplified data using the AUX-CH 140. Alternatively, the signal modification modules 310A, 310B electrically reshape received data to so enable transmission of the modified data over an increased distance, such as over an increased length of cable, with reduced degradation of the data.

In an alternate embodiment, the signal modification modules 320A, 320B modify one or more attributes, such as parameters or commands, associated with received data to generate a modified command that is transmitted to a destination device, such as the sink device 130, for use. Alternatively, the signal modification module 330 includes a protocol analyzer 210, as described above in conjunction with FIG. 2, which determines a type, format or protocol associated with received data and modifies the transmission of data to a destination, such as the sink device 130, based on the type, format or protocol.

For example, the first signal modification module 320A receives data from the first signal detector 310A describing link training commands and modifies the link training commands to allow transmission of the link training commands over a greater distance. As another example, the second signal modification module 320B receives data from the second signal detector 310B requesting reconfiguration of the Main Link 150 and amplifies the reconfiguration request by increasing a voltage associated with the reconfiguration request. Hence, the signal modification modules 320A, 320B modify data received from the AUX-CH 140 to facilitate data transmission using the AUX-CH 140, allowing improved transmission of commands using the AUX-CH 140.

In various embodiments, the signal detection modules 310A, 310B and the signal modification modules 320A, 320B comprise one or more processes executable by a hardware state machine, a processor (not shown) and/or one or more firmware applications. The process or processes can be configured to operate on a general purpose microprocessor or controller, a field programmable gate array (FPGA), an application specific integrated circuit (ASIC) or a combination thereof. In an embodiment, one or more of the signal detection modules 310A, 310B and the signal modification modules 320A, 320B comprise a processor configured to process data describing events which may comprise various computing architectures including a complex instruction set computer (CISC) architecture, a reduced instruction set computer (RISC) architecture or an architecture implementing a combination of instruction sets. A single processor or multiple processors can be used to implement one or more of the signal detection modules 310A, 310B and the signal modification modules 320A, 320B. In an embodiment, a computer readable storage medium includes instructions that, when executed cause one or more processors to implement the functions described above to implement the signal detectors 310A, 310B and/or the signal modification modules 320A, 320B.

System Operation

Figure 4:
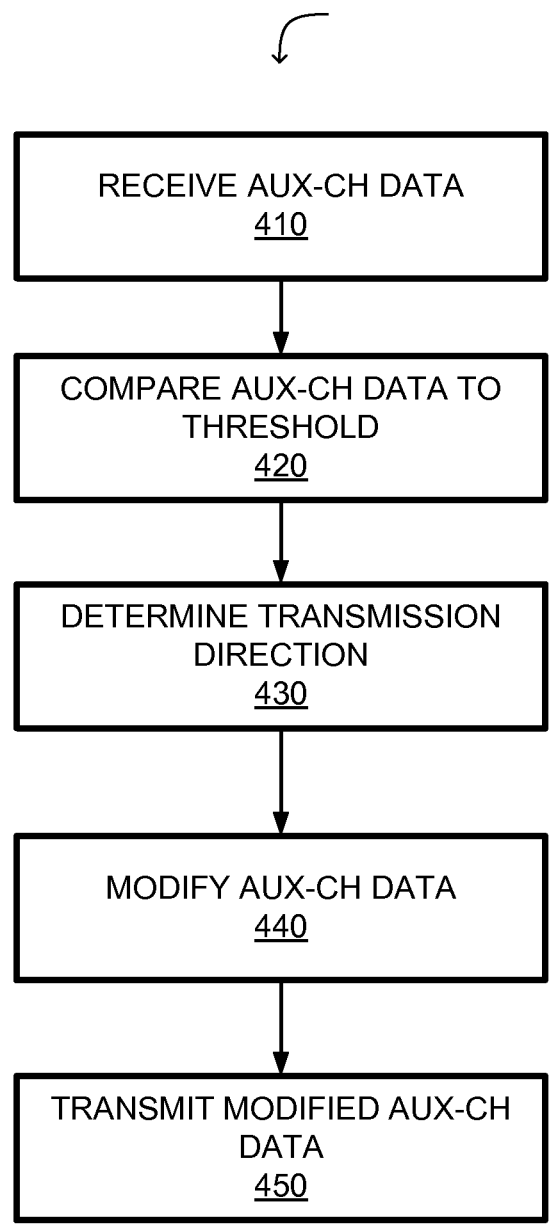
FIG. 4 is a flow chart of a method for modifying configuration data during transmission between a source device and a sink device using an auxiliary channel according to one embodiment of the invention.

FIG. 4 is a flow chart of one embodiment of a method 400 for modifying configuration or control data during transmission between a source device and a sink device using an auxiliary channel. In an embodiment, the steps depicted in the method shown in FIG. 4 are implemented by instructions for performing the described actions embodied or stored within a computer readable medium, such as a memory, which are executable by a processor. Those of skill in the art will recognize that the method may be implemented in embodiments of hardware and/or software or combinations thereof. Those of skill in the art will recognize that other embodiments can perform the steps of FIG. 4 in different orders or include different and/or additional steps than the ones described herein.

Initially, the active buffer 120 receives 410 data from the AUX-CH 140. As the active buffer 120 is coupled to the AUX-CH 140, as data is transmitted between the source device 110 and the sink device 130, the data is received 410 by the active buffer 120. To determine whether data such as a control command or configuration information, is received 410, signal detectors 310A, 310B included in the active buffer 120 compare 420 the received data to a threshold value. For example, the signal detectors 310A, 310B compare 420 a voltage of the received data to a threshold voltage and responsive to the voltage equaling or exceeding the threshold value, the signal detectors 310A, 310B determines that the AUX-CH 140 includes data, such as a command, configuration data or other data transmitted by the source device 110 or the sink device 130. For example, the first signal detector 310A determines whether data is received 410 from the source device 110 while the second signal detector 310A determines whether data is received 410 from the sink device 130. In this example, responsive to the received data having a voltage less than the threshold value, the signal detectors 310A, 310B determine that received data is ambient noise and the active buffer 120 does not perform an action. In other embodiments, the signal detectors 310A, 310B use different attributes of the received data to determine whether or not data is received 410 from the source device 110 or from the sink device 130. In an embodiment, responsive to receiving 410 data, a signal detector 310A, 310B transmits an enable signal so that power is supplied to a signal modification module 320A, 320B.

Responsive to determining that the received data is a command, configuration data or other data, the signal detectors 310A, 310B determine 430 the direction in which data is transmitted from the active buffer 120. Responsive to the first signal detector 310A determining that data is transmitted from the source device 110 to the sink device 130, it is determined 430 that data is transmitted from the active buffer 120 to the sink device 130, the first signal detector 310A communicates a disable signal to the second signal detector 320B to prevent transmission of data received from the sink device 130 to the source device 110 by the active buffer 120. Similarly, responsive to the second signal detector 310B determining that data is transmitted from the sink device 130 to the source device 110, it is determined 430 that data is transmitted from the active buffer 120 to the source device 110. Accordingly, the second signal detector 310B communicates a disable signal to the first signal detector 310A to prevent data transmission from the source device 110 to the sink device 130 by the active buffer 120. Hence, the signal detectors 310A, 310B determine 430 a single direction in which the active buffer 120 transmits data depending on the device from which the active buffer 120 receives data.

After determining 420 the direction in which data is transmitted, a signal modification module 320A, 320B modifies 440 the received data and the modified data, which is then transmitted 450 via the AUX-CH 140 to a destination. The first signal modification module 320A modifies 440 data received from the source device 110 by the first signal detector 310A and transmits 450 the modified data to the sink device 130 using the AUX-CH 140. The second signal modification module 320B modifies 440 data received from the sink device 130 by the second signal detection module 310B and transmits 450 the modified data to the source device 110 using the AUX-CH 140.

The signal modification modules 320A, 320B modify one or more attributes of the received data. For example, a signal modification module 320A, 320B increases a voltage of the received data, amplifying the received data for transmission over a longer distance via the AUX-CH 140. As another example, the signal modification module 330 electrically reshapes received data to enable transmission of the modified data over an increased distance, such as over an increased length of cable, with reduced degradation of the data.

In one embodiment, a protocol or type is associated with the received data when it is modified 440. For example, a protocol analyzer 210 determines whether received data is associated with link training commands or is associated with another type of command. Associating a protocol or type with stored data allows the protocol analyzer 210 to modify one or more parameters of the received data or to identify the purpose of the received data. Additionally, associating a protocol or type with stored data enables the protocol analyzer 210 to selectively modify a subset of the received data, while allowing transmission of certain received data without modification. For example, the protocol analyzer 210 compares one or more values of received command with stored values identifying a desired command. Examples of desired commands include commands modifying data transfer rate, Main Link voltage swings, Main Link pre-emphasis or other commands associated with link training Responsive to associating received data with information identifying a desired command, the protocol analyzer 210 modifies an attribute of the data associated with a desired command, producing a modified command. The modified command is communicated to a signal modification module 320A, 320B which further modifies the modified command.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for communicating configuration data between a source device and a sink device comprising:
a main communication channel coupled to the source device, the main communication channel configured to communicate data from the source device;
an auxiliary communication channel coupled to the source device and the sink device, the auxiliary communication channel configured to:
communicate configuration data received from the source device to the sink device, and
communicate configuration data received from the sink device to the source device; and
an active buffer coupled to the source device via the auxiliary communication channel and coupled to the sink device via the auxiliary communication channel, the active buffer configured to:
detect configuration data from the auxiliary communication channel,
determine whether the source device or the sink device generated the detected configuration data,
responsive to a determination that the detected configuration data was generated by the source device:
enable power to be received by a power supply input of a source signal modification module, the source signal modification module configured to identify a type associated with the detected configuration data and modify at least a portion of the detected configuration data based on the identified type, the source signal modification module having an output coupled to the sink device,
further modify, using the source signal modification module, at least a portion of the modified detected configuration data,
transmit the further modified configuration data to the sink device via the auxiliary communication channel, and
prohibit the configuration data transmitted by the sink device from being received at the source device.

2. The system of claim 1, wherein the active buffer is configured to, responsive to a determination that the detected configuration data was generated by the sink device:
enable power to be received by a power supply input of a sink signal modification module, the sink signal modification module configured to identify a type associated with the detected configuration data and modify at least a portion of the detected configuration data based on the identified type, the sink signal modification module having an output coupled to the source device,
permit the configuration data transmitted from the sink device to the source device, and prohibit the configuration data transmitted by the source device from being received at the sink device, and
further modify, using the sink signal modification module, at least a portion of the detected configuration data, and transmit the further modified configuration data to the sink device via the auxiliary communication channel.

3. The system of claim 1, wherein the active buffer further modifies the modified detected configuration data by modifying an attribute of the modified configuration data.

4. The system of claim 3, wherein modifying the attribute of the modified configuration data comprises increasing a voltage associated with the modified configuration data.

5. The system of claim 1, wherein the active buffer further modifies the modified detected configuration data by electrically reshaping the received configuration data.

6. The system of claim 1, wherein the source signal modification module remains in a powered-off state until the active buffer receives the configuration data from the source device.

7. An apparatus for communicating data between a source device and a sink device comprising:

an auxiliary channel configured to communicate configuration data between the source device and the sink device;

a first signal detector coupled to the source device via the auxiliary channel, the first signal detector configured to:
  detect the configuration data received from the source device via the auxiliary channel,
  generate a disable signal to prohibit the configuration data transmitted by the sink device from being received at the source device, and
  enable power to be provided by a first power supply responsive to detecting the configuration data received from the source device via the auxiliary channel;

a second signal detector coupled to the sink device via the auxiliary channel and coupled to receive the disable signal from the first signal detector, the second signal detector configured to:
  detect the configuration data received from the sink device via the auxiliary channel, and
  enable power to be provided by a second power supply responsive to detecting the configuration data received from the sink device via the auxiliary channel;

a first signal modification module coupled to the first signal detector and to the auxiliary channel, the first signal modification module configured to:
  receive power from the first power supply,
  modify the detected configuration data from the first signal detector to generate first modified data, and
  transmit the first modified data to the sink device using the auxiliary channel; and a second signal modification module coupled to the second signal detector and to the auxiliary channel, the second signal modification module configured to:
  receive power from the second power supply,
  modify the detected configuration data from the second signal detector to generate second modified data, and wherein the first signal modification module and the second signal modification module are coupled to a protocol analyzer configured to:
  identify a type of the detected configuration data received from the first signal detector or from the second signal detector, and
  prior to the first signal modification module or the second signal modification module generating the first modified data or the second modified data, respectively, modify at least a portion of the detected configuration data based on the identified type;
  transmit the second modified data to the source device using the auxiliary channel.

8. The apparatus of claim 7, wherein the first signal detector is coupled to the second signal detector, and responsive to the first signal detector determining the configuration data is received from the source device, the first signal detector transmits the disable signal to the second signal detector, the disable signal preventing the configuration data transmission from the sink device to the source device via the auxiliary channel.

9. The apparatus of claim 8, wherein the second signal detector transmits a second disable signal to the first signal detector responsive to the second signal detector determining the configuration data is received from the sink device, the second disable signal preventing the configuration data transmission from the source device to the sink device via the auxiliary channel.

10. The apparatus of claim 7, wherein modifying the detected configuration data from the first signal detector to generate the first modified data comprises increasing a voltage associated with the detected configuration data from the first signal detector.

11. The apparatus of claim 7, wherein modifying the detected configuration data from the first signal detector to generate the first modified data comprises electrically reshaping the detected configuration data from the first signal detector.

12. The apparatus of claim 7, wherein modifying the detected configuration data from the second signal detector to generate the second modified data comprises increasing a voltage associated with the detected configuration data from the second signal detector.

13. The apparatus of claim 7, wherein modifying the detected configuration data from the second signal detector to generate the second modified data comprises electrically reshaping the detected configuration data from the second signal detector.

* * * * *